United States Patent
Cypher et al.

(10) Patent No.: US 8,473,496 B2
(45) Date of Patent: Jun. 25, 2013

(54) UTILIZING DENSITY METADATA TO PROCESS MULTI-DIMENSIONAL DATA

(75) Inventors: Raymond Cypher, Sherwood Park (CA); Richard David Webster, Richmond (CA)

(73) Assignee: SAP France S.A., Paris (FR)

( * ) Notice: Subject to any disclaimer, the term of this patent is extended or adjusted under 35 U.S.C. 154(b) by 442 days.

(21) Appl. No.: 12/023,909

(22) Filed: Jan. 31, 2008

(65) Prior Publication Data

US 2009/0198643 A1    Aug. 6, 2009

(51) Int. Cl.
*G06F 17/30* (2006.01)

(52) U.S. Cl.
USPC .......................................................... 707/743

(58) Field of Classification Search
None
See application file for complete search history.

(56) References Cited

U.S. PATENT DOCUMENTS

| | | | |
|---|---|---|---|
| 6,085,286 A * | 7/2000 | Yamamoto et al. | 711/113 |
| 6,334,125 B1 * | 12/2001 | Johnson et al. | 707/713 |
| 6,456,997 B1 * | 9/2002 | Shukla | 1/1 |
| 7,698,257 B2 | 4/2010 | Momen-Pour et al. | |
| 2002/0029207 A1 * | 3/2002 | Bakalash et al. | 707/1 |
| 2003/0093407 A1 * | 5/2003 | Cochrane et al. | 707/2 |
| 2004/0122844 A1 * | 6/2004 | Malloy et al. | 707/102 |
| 2005/0289119 A1 * | 12/2005 | Weinberg et al. | 707/2 |
| 2007/0061291 A1 * | 3/2007 | Azizi | 707/2 |
| 2007/0299860 A1 * | 12/2007 | Westman et al. | 707/102 |
| 2008/0027970 A1 * | 1/2008 | Zhuge et al. | 707/102 |
| 2008/0301086 A1 * | 12/2008 | Gupta | 707/2 |

* cited by examiner

*Primary Examiner* — Bai D. Vu
(74) *Attorney, Agent, or Firm* — Mintz, Levin, Cohn, Ferris, Glovsky and Popeo, P.C.

(57) ABSTRACT

A computer readable storage medium includes a data analyzer to build population sets for dimensions of a multi-dimensional data source and to identify intersections of population sets so as to form density metadata. A query processor accesses the density metadata while processing a query.

28 Claims, 4 Drawing Sheets

UTILIZING DENSITY METADATA TO PROCESS MULTI-DIMENSIONAL DATA

FIELD OF THE INVENTION

This invention relates generally to the processing of digital data. More particularly, this invention relates to the construction and utilization of density metadata to facilitate the processing of multi-dimensional data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems to collect, store, and manage rawxAdata.

On-line Analytical Processing (OLAP) tools are a subset of business intelligence tools. There are a number of commercially available OLAP tools including Business Objects Voyager™ which is available from Business Objects, an SAP Company, San Jose, Calif. OLAP tools generate reports and are otherwise suited for ad hoc analyses. OLAP generally refers to a technique of providing fast analysis of shared multi-dimensional information stored in a database. OLAP systems provide a multi-dimensional conceptual view of data, including full support for hierarchies and multiple hierarchies. This framework is used because it is a logical way to analyze business information. In some OLAP tools the data is arranged in a schema that simulates a multidimensional schema. The multi-dimensional schema means redundant information is stored, but it allows for users to initiate queries without the need to know how the data is organized.

The size of a multi-dimensional data source grows geometrically with the number of dimensions that characterize the data. However, the number of populated members in the data grows at a slow rate. This leads to the data source being sparse. Typically, a sparse data source has non-populated values (e.g. null or zero values) in ninety percent or more of its cells.

Operations to retrieve or manipulate data in a sparse data source can be very inefficient because the operations often need to visit each and every member in a specified range of dimensions or combinations of dimensions. Typically these members are visited whether populated or not. Thus, in sparse cubes all members of the cube are typically visited, yet the majority of the members have no effect on the results.

In view of the foregoing, it would be desirable to provide improved techniques for processing sparse multi-dimensional data.

SUMMARY OF THE INVENTION

The invention includes a computer readable storage medium with executable instructions to build population sets for dimensions of a multi-dimensional data source. Intersections of population sets are identified to form density metadata.

The invention includes a computer readable storage medium with a data analyzer to build population sets for dimensions of a multi-dimensional data source and to identify intersections of population sets so as to form density metadata. A query processor accesses the density metadata while processing a query.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
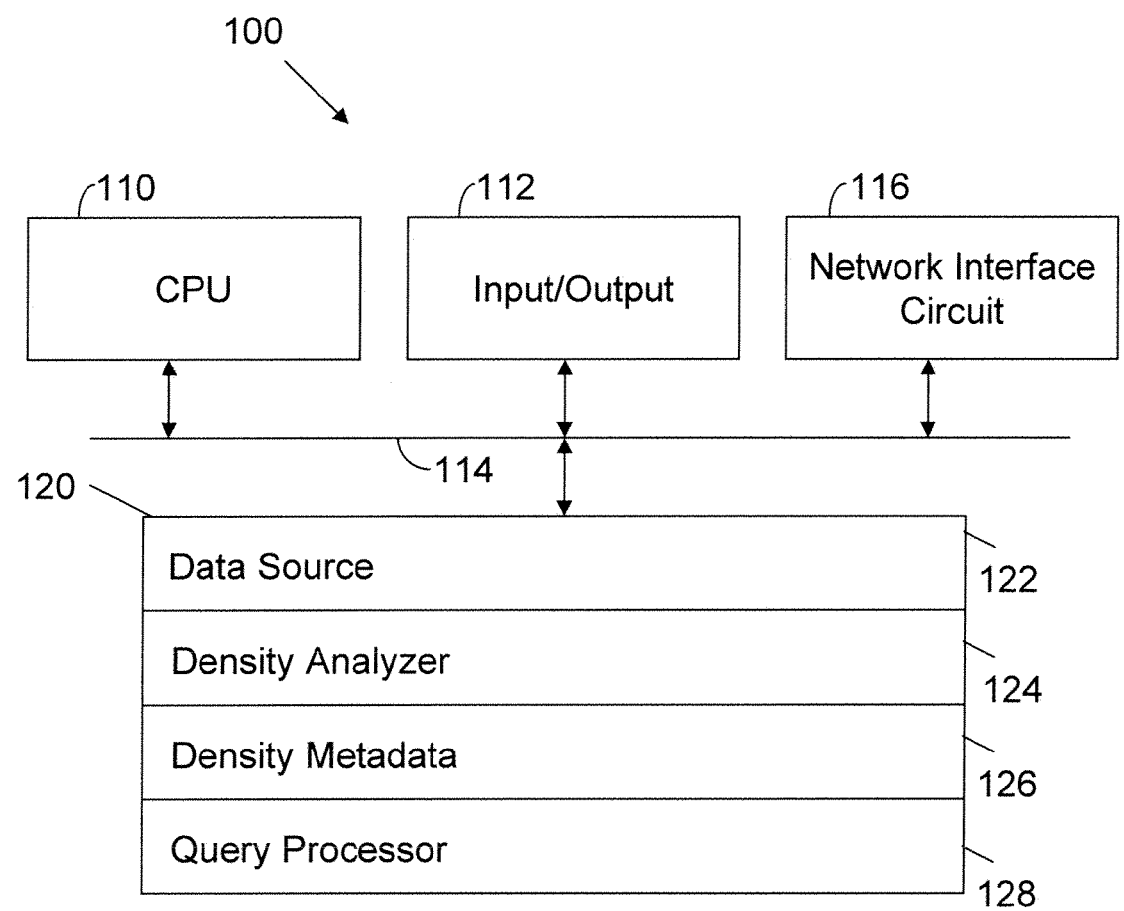
FIG. 1 illustrates a computer configured in accordance with an embodiment of the invention.

FIG. 1 illustrates a computer 100 configured in accordance with an embodiment of the invention. The computer 100 includes standard components, such as a central processing unit (CPU) 110 connected to input/output devices 112 via a bus 114. The input/output devices 112 may include a keyboard, mouse, display, printer and the like. A network interface circuit 116 is also connected to the bus 114 to provide connectivity to a network (not shown). Thus, the invention is operative in a networked environment.

A memory 120 is also connected to the bus 114. The memory 120 includes a data source 122, such as a multi-dimensional data source. A density analyzer 124 is also stored in the memory 120. The density analyzer 124 includes executable instructions to analyze the density of the data source 122. For example, the density analyzer 124 includes executable instructions to scan different dimensions of the data source 122 and to flag the locations in which data exists. The locations of data represent density information or density metadata 126. As discussed below, the scanning operation can be simplified by limiting the scanning to groups of values, hierarchical information and/or limiting the number of intersections of the multi-dimensional data.

The memory 120 also includes a query processor 128. The query processor 128 includes executable instructions to process a query using standard techniques. However, in addition to instructions for standard query processing, the query processor 128 includes executable instructions to initially access the density metadata 126 to identify the locations of data. This allows the query processor 128 to efficiently access data without accessing large numbers of null values that deteriorate performance.

Figure 2:
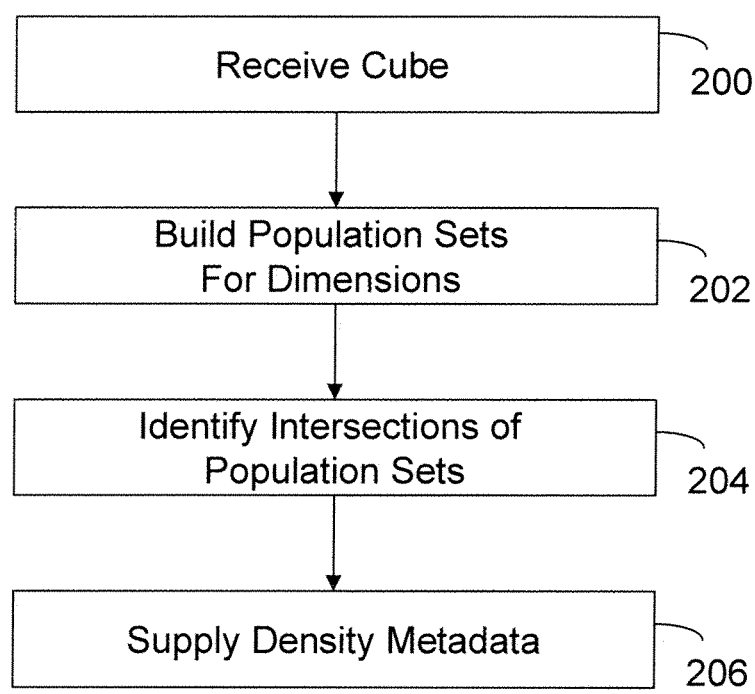
FIG. 2 illustrates processing operations associated with an embodiment of the invention.

FIG. 2 illustrates processing operations associated with an embodiment of the density analyzer 124. Initially, a multi-dimensional cube is accessed or received 200. Population sets are then built for two or more dimensions 202. A population set is information characterizing the location of data in a dimension.

Figure 3:
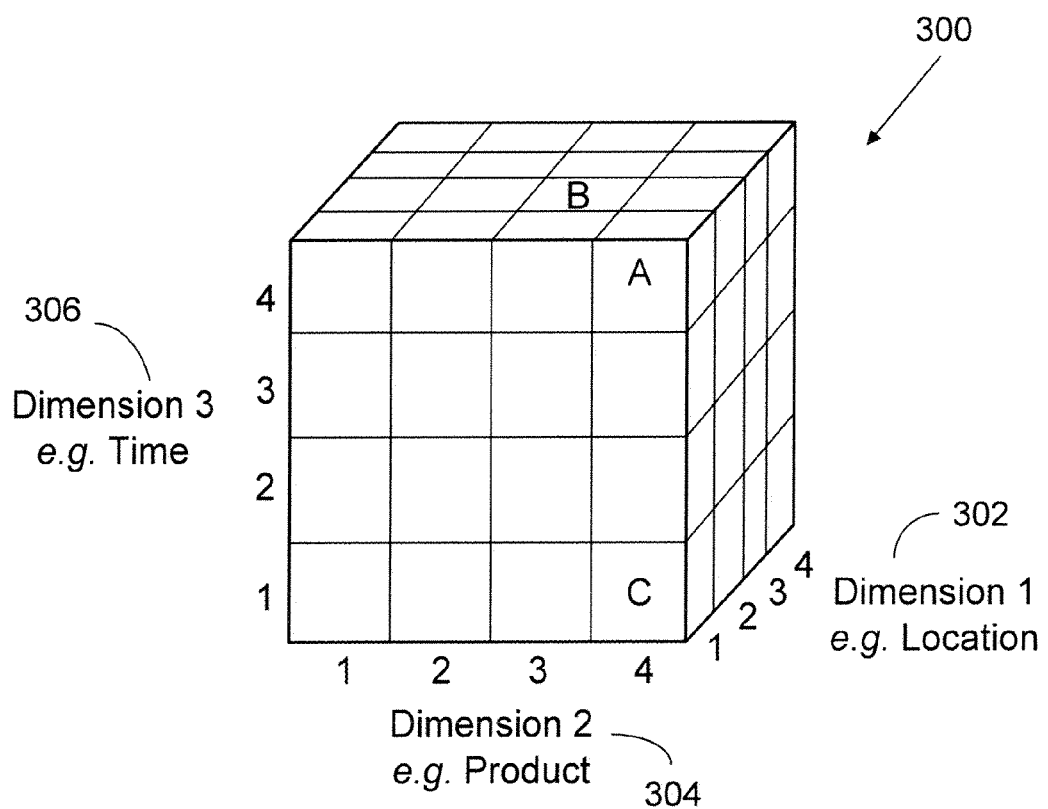
FIG. 3 illustrates multi-dimensional data processed in accordance with an embodiment of the invention.

Consider the multi-dimensional data 300 of FIG. 3. The data 300 includes a first dimension 302 specifying locations, a second dimension 304 specifying products, and a third dimension 306 specifying times. The multi-dimensional data only has three populated cells, indicated by A, B and C. Value A is located at index value 1 of dimension 1, index value 4 of dimension 2 and index value 4 of dimension 3 or A=(1, 4, 4).

Value B is located at index value 2 of dimension 1, index value 3 of dimension 2 and index value 4 of dimension 3 or B=(2, 3, 4). Value C is located at index value 1 of dimension 1, index value 4 of dimension 2 and index value 1 of dimension 3 or C=(1, 4, 1).

A population set indicates which members of a dimension are populated. In the example of FIG. 3, the first dimension 302 has members at index values 1 (A and C) and 2 (B). The second dimension 304 has members at index values 3 (B) and 4 (A and C). The third dimension 306 has members at index values 1 (C) and 4 (A and B). Therefore, the population sets in this example are: Dimension 1=(1, 2), Dimension 2=(3, 4) and Dimension 3=(1, 4).

Returning to FIG. 2, the next processing operation is to identify intersections of population sets 204. The intersections are identified for some combination of the specified dimensions. For example, consider the following combination of intersections: dimensions 1 and 2 (i.e., I12), dimensions 1 and 3 (i.e., I13) and dimensions 2 and 3 (i.e., I23).

For I12, the value C is at dimension 1 index position 1 and dimension 2 index position 4. The value B is at dimension 1 index position 2 and dimension 2 index position 3. Thus, the intersection of dimensions 1 and 2 may be expressed as I12= (1/4, 2/3).

For I13, the value C is at dimension 1 index position 1 and dimension 3 index position 1. The value A is at dimension 1 index position 1 and dimension 3 index position 4. The value B is at dimension 1 index position 2 and dimension 3 index position 4. Thus, the intersection of dimensions 1 and 3 may be expressed as I13=(1/1, 1/4, 2/4).

For I23, the value B is at dimension 2 index position 3 and dimension 3 index position 4. The value C is at dimension 2 index position 4 and dimension 3 index position 1. The value A is at dimension 2 index position 4 and dimension 3 index position 4. Thus, the intersections of dimensions 2 and 3 may be expressed as I23=(3/4, 4/1, 4/4).

At this point the intersections of the population sets have been identified. These intersections constitute density metadata for the multi-dimensional data. This density metadata is supplied or otherwise made available to the query processor 128, which is the last operation 206 of FIG. 2.

Figure 4:
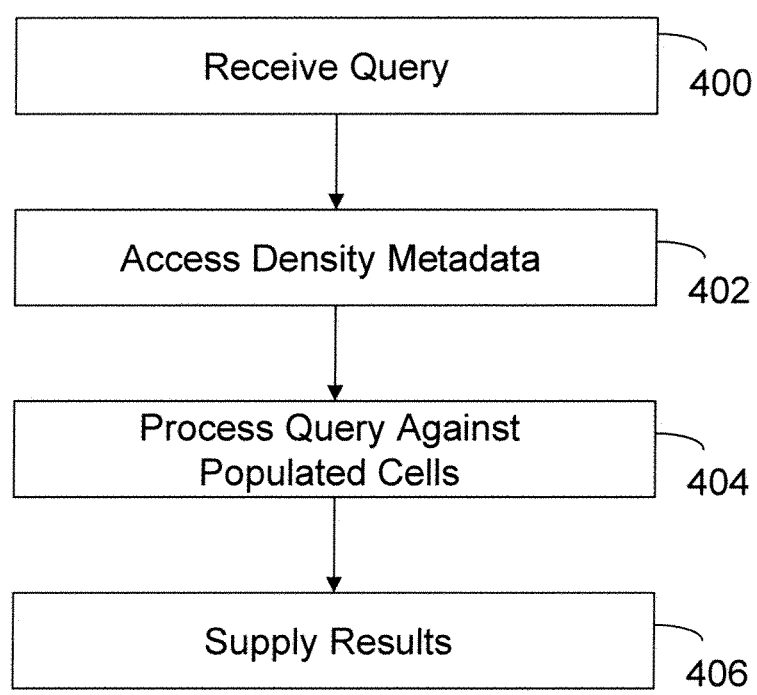
FIG. 4 illustrates processing operations associated with an embodiment of the invention.

FIG. 4 illustrates processing operations performed by a query processor 128 constructed in accordance with an embodiment of the invention. The query processor 128 receives a query 400. The query processor 128 accesses the density metadata 402. The query is then processed against populated cells 404, as indicated by the density metadata 402. Results are then supplied to the user 406.

The invention may be implemented without identifying the intersections of all population sets. In some embodiments, some dimensions or combinations of dimensions are tracked, while others are not. For example, consider multi-dimensional data with dimensions A, B and C. The density metadata sets may be A, B, C, A/B, A/C and B/C. If one queries for the populated combinations of A, B and C, then this could be done by combining the results of the A/B set with the set for C. However, it is also possible to combine the results of A/B, A/C and B/C to produce the most minimal set of result combinations, but with more processing required. The populated and potential sizes of the sets may be used to determine the most efficient combination of sets to invoke.

The size of the density metadata may be further reduced by tracking data population for groups of members in a dimension instead of tracking each member individually. For example, for a very large dimension, the information may be tracked for groups of 10 members. This reduces the size of the metadata, but also makes the population query results less granular.

Where hierarchical dimensions are involved, it is also possible to track members with populated descendants. This requires additional sets in the density metadata to track whether any of the descendants of a member has a populated value. When values are populated in the system, the sets should be updated for each ancestor of each member. Also, when tracking this data for combinations of dimensions, the order of the dimension becomes important. For example, one set may track the members of dimension A that have populated descendants for each member in dimension B. Another set may track the members of dimension B that have populated descendants for each member in dimension A.

Other embodiments of the invention include building population sets for a sub-set of the dimensions of the multi-dimensional data source. Population sets may also be specified in terms of probable data locations.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
build population sets for dimensions of a multi-dimensional data source by scanning the dimensions and flagging locations in which data exists, wherein the population set characterizes locations of cells having populated values in a dimension in the multi-dimensional data source, wherein the multi-dimensional data source is a sparse data source with non-populated values in ninety percent or more of its cells, wherein at least a portion of the dimensions are hierarchical having ancestor and descendant members, wherein the density metadata identifies ancestors having descendants with populated values and identifies ancestors having descendants with no populated values;

identify intersections of population sets to form density metadata;

receive data characterizing a query;

access the density metadata to identify locations of data; and execute the query against the identified locations of data without accessing large numbers of null values in the sparse data source.

2. The computer readable storage medium of claim 1 further comprising executable instructions to access multi-dimensional cells specified by the density metadata.

3. The computer readable storage medium of claim 1 wherein the executable instructions to build include executable instructions to build population sets for each dimension of the multi-dimensional data source.

4. The computer readable storage medium of claim 1 further comprising executable instructions to build population sets for a sub-set of dimensions of the multi-dimensional data source.

5. The computer readable storage medium of claim 1 wherein the executable instructions to build include executable instructions to build population sets based upon all members of a dimension having populated values.

6. The computer readable storage medium of claim 1 wherein the executable instructions to build include executable instructions to build population sets based upon a sub-set of members of a dimension having populated values.

7. The computer readable storage medium of claim 1 wherein the executable instructions to build include executable instructions to build population sets based upon hierarchical data.

8. The computer readable storage medium of claim 1 wherein the executable instructions to build include executable instructions to build population sets based upon probable data locations.

9. The computer readable storage medium of claim 1 wherein the executable instructions to identify intersections of population sets include executable instructions to identify all intersections of population sets.

10. The computer readable storage medium of claim 1 wherein the executable instructions to identify intersections of population sets include executable instructions to identify a sub-set of all intersections of population sets.

11. A non-transitory computer readable storage medium, comprising:

a data analyzer to build population sets for dimensions of a multi-dimensional data source by scanning the dimensions and flagging locations in which data exists, and to identify intersections of population sets so as to form density metadata, wherein the multi-dimensional data source is a sparse data source with non-populated values in ninety percent or more of its cells, wherein at least a portion of the dimensions are hierarchical having ancestor and descendant members, wherein the density metadata identifies ancestors having descendants with populated values and identifies ancestors having descendants with no populated values; and a query processor to access the density metadata while processing a query to identify locations of data and thereby form a query that efficiently accesses data without accessing large numbers of null values in the sparse data source.

12. The computer readable storage medium of claim 11 wherein the data analyzer builds population sets for each dimension of the multi-dimensional data source.

13. The computer readable storage medium of claim 11 wherein the data analyzer builds population sets for a sub-set of dimensions of the multi-dimensional data source.

14. The computer readable storage medium of claim 11 wherein the data analyzer builds population sets based upon all members of a dimension having populated values.

15. The computer readable storage medium of claim 11 wherein the data analyzer builds population sets based upon a sub-set of members of a dimension having populated values.

16. The computer readable storage medium of claim 11 wherein the data analyzer builds population sets based upon probable data locations.

17. The computer readable storage medium of claim 11 wherein the data analyzer identifies all intersections of population sets.

18. The computer readable storage medium of claim 11 wherein the data analyzer identifies a sub-set of all intersections of population sets.

19. A method for implementation by one or more data processors comprising:

building, by at least one data processor, population sets for dimensions of a multi-dimensional data source by scanning the dimensions and flagging locations in which data exists, wherein the population set characterizes locations of cells having populated values in a dimension in the multi-dimensional data source, wherein the multi-dimensional data source is a sparse data source with non-populated values in ninety percent or more of its cells, wherein at least a portion of the dimensions are hierarchical having ancestor and descendant members, wherein the density metadata identifies ancestors having descendants with populated values and identifies ancestors having descendants with no populated values;

identifying, by at least one data processor, intersections of population sets to form density metadata;

receiving, by at least one data processor, data characterizing a query;

accessing, by at least one data processor, the density metadata to identify locations of data; and executing, by at least one data processor, the query against the identified locations of data without accessing large numbers of null values in the sparse data source.

20. The method of claim 19, further comprising:
accessing, by at least one data processor, multi-dimensional cells specified by the density metadata.

21. The method of claim 19, further comprising:
building, by at least one data processor, population sets for each dimension of the multi-dimensional data source.

22. The method of claim 19, further comprising:
building, by at least one data processor, population sets for a sub-set of dimensions of the multidimensional data source.

23. The method of claim 19, further comprising:
building, by at least one data processor, population sets based upon all members of a dimension having populated values.

24. The method of claim 19, further comprising:
building, by at least one data processor, population sets based upon a sub-set of members of a dimension having populated values.

25. The method of claim 19, further comprising:
building, by at least one data processor, population sets based upon hierarchical data.

26. The method of claim 19, further comprising:
building, by at least one data processor, population sets based upon probable data locations.

27. The method of claim 19, wherein identifying intersections of population sets comprises identifying all intersections of population sets.

28. The method of claim 19, wherein identifying intersections of population sets comprises identifying a sub-set of all intersections of population sets.

* * * * *